US012630425B2

(12) United States Patent
Schmidt et al.

(10) Patent No.: US 12,630,425 B2
(45) Date of Patent: May 19, 2026

(54) METHOD FOR DRYING AND PURIFYING LiFSI

(71) Applicant: Arkema France, Colombes (FR)

(72) Inventors: Grégory Schmidt, Saint Andeol le Chateau (FR); Rémy Teissier, Francheville (FR)

(73) Assignee: ARKEMA FRANCE, Puteaux (FR)

(*) Notice: Subject to any disclaimer, the term of this patent is extended or adjusted under 35 U.S.C. 154(b) by 957 days.

(21) Appl. No.: 17/358,819

(22) Filed: Jun. 25, 2021

(65) Prior Publication Data

US 2021/0323823 A1 Oct. 21, 2021

Related U.S. Application Data

(62) Division of application No. 16/331,242, filed as application No. PCT/FR2017/053447 on Dec. 7, 2017, now Pat. No. 11,084,723.

(30) Foreign Application Priority Data

Dec. 8, 2016 (FR) ...................................... 1662130

(51) Int. Cl.

*C01B 21/086* (2006.01)
*B01D 1/22* (2006.01)
*B01D 11/04* (2006.01)
*C01B 21/093* (2006.01)
*H01M 10/0525* (2010.01)
*H01M 10/0568* (2010.01)

(52) U.S. Cl.

CPC .............. *C01B 21/086* (2013.01); *B01D 1/22* (2013.01); *C01B 21/0935* (2013.01); *H01M 10/0525* (2013.01); *H01M 10/0568* (2013.01); *B01D 11/0492* (2013.01); *C01P 2006/40* (2013.01); *H01M 2300/0025* (2013.01); *Y02P 20/133* (2015.11)

(58) Field of Classification Search

CPC ..... C01B 21/086; C01B 21/0935; B01D 1/22; B01D 11/0492; H01M 10/0525; H01M 10/0568; H01M 2300/0025; C01P 2006/40; Y02P 20/133; Y02E 60/10

See application file for complete search history.

(56) References Cited

U.S. PATENT DOCUMENTS

| | | | | |
|---|---|---|---|---|
| 4,551,314 | A * | 11/1985 | Beckstead | C22B 3/28 423/658.5 |
| 9,079,780 | B2 | 7/2015 | Sato et al. | |
| 9,586,833 | B2 | 3/2017 | Sato et al. | |
| 2012/0014859 | A1* | 1/2012 | Honda | C01B 21/093 548/335.1 |
| 2012/0041233 | A1 | 2/2012 | Sato et al. | |
| 2012/0258357 | A1 | 10/2012 | Kim | |
| 2012/0289693 | A1 | 11/2012 | Coleman et al. | |
| 2013/0068991 | A1* | 3/2013 | Sato | H01G 9/035 423/386 |
| 2013/0323155 | A1 | 12/2013 | Tsubokura et al. | |
| 2015/0086466 | A1 | 3/2015 | Sato et al. | |
| 2017/0110769 | A1 | 4/2017 | Metz | |
| 2019/0292053 | A1 | 9/2019 | Schmidt et al. | |
| 2019/0379088 | A1 | 12/2019 | Schmidt et al. | |
| 2021/0214239 | A1 | 7/2021 | Leduc et al. | |
| 2021/0323823 | A1 | 10/2021 | Schmidt et al. | |

FOREIGN PATENT DOCUMENTS

| | | | | |
|---|---|---|---|---|
| EP | 2415709 | A1 | 2/2012 | |
| EP | 2505551 | A1 | 10/2012 | |
| EP | 2578533 | A1 | 4/2013 | |
| EP | 2662332 | A1 | 11/2013 | |
| EP | 2977349 | A1 | 1/2016 | |
| EP | 2977349 | B1 * | 8/2018 | C01B 21/086 |
| FR | 3020060 | A1 | 10/2015 | |
| FR | 3022695 | A1 | 12/2015 | |
| JP | 2010254543 | A | 11/2010 | |
| JP | 2013091524 | A | 5/2013 | |

(Continued)

OTHER PUBLICATIONS

Henan Lanphan Industry Co.—Rotary Evaporator VS. Short Path Distillation (Year: 2022).*

(Continued)

*Primary Examiner* — Anthony J Zimmer
*Assistant Examiner* — Logan Laclair
(74) *Attorney, Agent, or Firm* — BUCHANAN INGERSOLL & ROONEY PC

(57) ABSTRACT

A method for drying and purifying a lithium bis(fluorosulfonyl)imide salt in solution in an organic solvent S1, the method including the following steps: a) adding deionised water to dissolve and extract the lithium bis(fluorosulfonyl) imide salt, forming an aqueous solution of the salt; b) extracting the lithium bis(fluorosulfonyl)imide salt from the aqueous solution, using an organic solvent S2, the step being repeated at least once; c) concentrating the lithium bis (fluorosulfonyl)imide salt by evaporating the organic solvent S2 and the water, in a short-path thin-film evaporator, under the following conditions: temperature of 30° C. to 95° C., pressure of $10^{-3}$ mbar abs to 5 mbar abs, residence time no longer than 15 min; and d) optionally crystallising the lithium bis(fluorosulfonyl)imide salt. Also, a composition made of lithium bis(fluorosulfonyl)imide salt, and the uses thereof in Li-ion batteries.

15 Claims, No Drawings

(56) References Cited

FOREIGN PATENT DOCUMENTS

| | | | |
|---|---|---|---|
| JP | 2014516907 | A | 7/2014 |
| JP | 2014148258 | A | 8/2014 |
| JP | 2014201453 | A | 10/2014 |
| JP | 2015051805 | A | 3/2015 |
| JP | 2016088809 | A | 5/2016 |
| JP | 2018052760 | A | 4/2018 |
| JP | 2018055882 | A | 4/2018 |
| WO | 2011049095 | A1 | 4/2011 |
| WO | 2011065502 | A1 | 6/2011 |
| WO | 2012118063 | A1 | 9/2012 |
| WO | 2014148258 | A1 | 9/2014 |
| WO | 2015158979 | A1 | 10/2015 |

OTHER PUBLICATIONS

Glover et al. (Selecting Evaporators for Process Applications, Heat Transfer, 2004) (Year: 2004).*

Purdue (Boiling, 2001) (Year: 2001).*

International Search Report (PCT/ISA/210) and Written Opinion (PCT/ISA/237) mailed on Feb. 13, 2018, by the European Patent Office as the International Searching Authority for International Application No. PCT/FR2017/053446.

International Search Report (PCT/ISA/210) and Written Opinion (PCT/ISA/237) mailed on Jan. 29, 2018, by the European Patent Office as the International Searching Authority for International Application No. PCT/FR2017/053447.

Third Party Observation dated Nov. 5, 2018, by the European Patent Office as the International Searching Authority for International Application No. PCT/FR2017/053447.

Third Party Observation dated Oct. 10, 2018, by the European Patent Office as the International Searching Authority for International Application No. PCT/FR2017/053446.

Office Action (Notice of Reasons for Rejection) issued Jul. 27, 2020 by the Japanese Patent Office in corresponding Japanese Patent Application No. 2019-515208, and an English Translation of the Office Action.

* cited by examiner

METHOD FOR DRYING AND PURIFYING LiFSI

CROSS REFERENCE TO RELATED APPLICATIONS

The present application is a divisional of U.S. application Ser. No. 16/331,242, filed on Mar. 7, 2019, which is a U.S. national stage of International Application No. PCT/FR2017/053447, filed on Dec. 7, 2017, which claims the benefit of French Application No. 1662130, filed on Dec. 8, 2016. The entire contents of each of U.S. application Ser. No. 16/331,242, International Application No. PCT/FR2017/053447, and French Application No. 1662130 are hereby incorporated herein by reference in their entirety.

TECHNICAL FIELD

The present invention relates to the field of Li-ion batteries. More particularly, the invention relates to a process for drying and purifying a lithium bis(fluorosulfonyl)imide salt.

The invention also relates to a process for manufacturing a lithium bis(fluorosulfonyl)imide salt, which has been dried and purified by means of the drying and purification process according to the invention. The present invention also relates to a lithium bis(fluorosulfonyl)imide salt comprising a reduced content of water and of sulfates, and various uses thereof.

BACKGROUND

The development of higher-power batteries is required for the Li-ion battery market. This is done by increasing the nominal voltage of Li-ion batteries. To achieve the targeted voltages, high-purity electrolytes are required. By virtue of their very low basicity, anions of sulfonylimide type are increasingly used in the field of energy storage in the form of inorganic salts in batteries, or of organic salts in supercapacitors or in the field of ionic liquids.

In the specific field of Li-ion batteries, the salt that is currently the most widely used is $LiPF_6$. This salt has many drawbacks, such as limited thermal stability, sensitivity to hydrolysis and thus poorer safety of the battery. Recently, novel salts bearing the fluorosulfonyl group $FSO_2^-$ have been studied and have demonstrated many advantages such as better ion conductivity and resistance to hydrolysis. One of these salts, LiFSI has shown highly advantageous properties which make it a good candidate for replacing $LiPF_6$.

The identification and quantification of impurities in salts and/or electrolytes and the understanding of their impacts on battery performance have become paramount. For example, on account of their interference with electrochemical reactions, impurities bearing a labile proton lead to overall reduced performance qualities and stability for Li-ion batteries. The application of Li-ion batteries makes it necessary to have high-purity products (minimum amount of impurities and in particular with a very low residual moisture content).

U.S. Pat. No. 9,079,780 describes various methods for concentrating LiFSI, to overcome the formation of byproducts:

- drying under a stream of dry inert gas;
- and/or
- concentration of an LiFSI solution via a thin-film evaporator.

The examples of said document describe the production of LiFSI with high contents of water and of sulfates. Such salts in particular have drawbacks such as problems of corrosion of the current collector, safety, etc.

There is a need for a novel process for drying a lithium bis(fluorosulfonyl)imide salt which makes it possible especially to obtain said salt with a reduced content of residual water and of sulfates.

There is also a need to provide novel LiFSI compositions which do not have the drawbacks of the known LiFSI salts, and which are especially compatible with applications in electronics, such as Li-ion batteries.

DETAILED DESCRIPTION

According to a first aspect, the invention relates to a process for drying and purifying a lithium bis(fluorosulfonyl)imide salt in solution in an organic solvent S1, said process comprising the following steps:

a) addition of deionized water to dissolve and extract the lithium bis(fluorosulfonyl)imide salt, forming an aqueous solution of said salt;

a') optional concentration of said aqueous solution of said salt;

b) extraction of the lithium bis(fluorosulfonyl)imide salt from said aqueous solution, with an organic solvent S2, said solvent S2 preferably forming an azeotropic mixture with water, this step being repeated at least once;

c) concentration of said lithium bis(fluorosulfonyl)imide salt by evaporation of said organic solvent S2 and of the water, in a short-path thin-film evaporator, under the following conditions:
   - temperature between 30° C. and 95° C., preferably between 30° C. and 90° C., preferentially between 40° C. and 85° C.;
   - pressure between $10^{-3}$ mbar abs and 5 mbar abs;
   - residence time of less than or equal to 15 min, preferably less than or equal to 10 min and advantageously less than or equal to 5 min;

d) optionally, crystallization of the lithium bis(fluorosulfonyl)imide salt.

In the context of the invention, the terms "lithium salt of bis(fluorosulfonyl)imide", "lithium bis(sulfonyl)imide", "LiFSI", "$LiN(FSO_2)_2$", "lithium bis(sulfonyl)imide" and "lithium bis(fluorosulfonyl)imide" are used equivalently.

In the context of the invention, the term "ppm" is understood as ppm on a weight basis.

For example, the term "salt with a water content of less than or equal to 40 ppm by weight" means a salt with a water content of less than or equal to 40 ppm by weight relative to the total weight of said salt.

The initial solution of lithium bis(fluorosulfonyl)imide salt may come from any synthesis of the lithium bis(fluorosulfonyl)imide salt, in particular comprising the following steps:

i) synthesis of bis(chlorosulfonyl)imide;

ii) fluorination of bis(chlorosulfonyl)imide to bis(fluorosulfonyl)imide;

iii) preparation of an alkali metal or alkaline-earth metal salt of bis(fluorosulfonyl)imide by neutralization of the bis(fluorosulfonyl)imide;

iv) cation exchange to obtain the lithium bis(fluorosulfonyl)imide salt.

On conclusion of these steps, the lithium bis(fluorosulfonyl)imide salt is preferably obtained in solution in an organic solvent (corresponding in particular to the solvent S1), at a mass concentration of between 5% and 50% by mass relative to the total mass of the solution.

Such a process is described, for example, in WO 2015/158979.

According to one embodiment, the abovementioned organic solvent S1 is chosen from the group constituted of esters, nitriles, ethers, chlorinated solvents and aromatic solvents, and mixtures thereof. Preferably, the solvent S1 is chosen from dichloromethane, ethyl acetate, butyl acetate, tetrahydrofuran, acetonitrile and diethyl ether, and mixtures thereof. Preferably, the organic solvent S1 is butyl acetate.

According to the invention, the organic solvent S1 and the organic solvent S2 may be identical or different.

Preferably, the organic solvent S1 and the organic solvent S2 are identical.

According to one embodiment, the mass content of LiFSI in the organic solvent S1 is between 5% and 55%, preferably between 5% and 50%, preferentially between 10% and 55%, advantageously between 10% and 50%, for example between 10% and 40%, in particular between 15% and 40% and preferentially between 25% and 35% by mass, relative to the total mass of the solution.

According to one embodiment, step a) of the purification and drying process according to the invention comprises the addition of deionized water to the solution of LiFSI in the abovementioned organic solvent S1, for example obtained during previous synthetic steps, to allow the dissolution of said salt and the extraction of said salt into water (aqueous phase).

The extraction may be performed via any known extraction means. The extraction may typically be the separation of an aqueous phase (aqueous solution of said salt in the present case) and of an organic phase.

According to the invention, step a) of the process may be repeated at least once.

The drying and purification step of the invention may comprise one or more extractions with deionized water, for example three extractions. In a first extraction, an amount of deionized water corresponding to half of the mass of the initial solution may be added, followed by an amount equal to about a third of the mass of the initial solution during the second extraction, and then an amount equal to about a quarter of the mass of the initial solution during the third extraction.

According to a preferred embodiment, step a) is such that the mass of deionized water is greater than or equal to a third, preferably greater than or equal to half, of the mass of the initial solution of LiFSI in the organic solvent S1 (in the case of a single extraction, or for the first extraction only if step a) is repeated at least once).

The process according to the invention may comprise the addition of a volume of deionized water in step a) of greater than or equal to a third, preferably greater than or equal to half of the volume of solvent S1 of the initial solution.

In the case of multiple extractions (repetition of step a)), the extracted aqueous phases may be pooled together to form a single aqueous phase.

Step a) advantageously allows the production of an aqueous phase and an organic phase, which are separate. Step b) is thus advantageously performed on the aqueous solution extracted in step a) (single aqueous phase or pooled aqueous phases in the case of repetition of step a)).

Preferably, in the process according to the invention, the organic phase(s) separated from the aqueous solution extracted in step a) (comprising the organic solvent S1 and LiFSI) are not reintroduced into the subsequent steps b) to d) of the process; in particular, they are not subsequently pooled with the organic phases extracted during step b) (comprising the organic solvent S2).

On conclusion of step a), an aqueous solution of LiFSI is obtained in particular.

According to one embodiment, the mass content of LiFSI in the aqueous solution is between 5% and 35%, preferably between 10% and 25%, relative to the total mass of the solution.

The process according to the invention may comprise a concentration step a') between step a) and step b), preferably to obtain an aqueous solution of LiFSI comprising a mass content of LiFSI of between 20% and 80%, in particular between 25% and 80%, preferably between 25% and 70% and advantageously between 30% and 65% relative to the total mass of the solution. The concentration step may be performed with a rotary evaporator under reduced pressure, at a pressure below 50 mbar abs (preferably below 30 mbar abs), and in particular at a temperature of between 25° C. and 60° C., preferably between 25° C. and 50° C., preferentially between 25° C. and 40° C., for example at 40° C.

Preferably, the drying and purification process according to the invention comprises step a'). After concentration a') of the aqueous solution obtained on conclusion of step a), a concentrated aqueous solution of LiFSI is obtained.

The LiFSI, contained in the aqueous solution obtained on conclusion of step a) and of an optional concentration step a') or of another optional intermediate step, may then be recovered by extraction with an organic solvent S2, said solvent S2 preferably being able to form an azeotrope with water (step b). Step b) of the process according to the invention leads in particular, after extraction, to an organic phase, saturated with water, containing the LiFSI (it is a solution of LiFSI in the organic solvent S2, said solution being saturated with water).

The extraction typically allows the separation of an aqueous phase and of an organic phase (solution of LiFSI in the solvent S2 in the present case).

Step b) advantageously allows the production of an aqueous phase and an organic phase, which are separate.

The solvent S2 for extraction of the LiFSI salt dissolved in deionized water is advantageously:

- a good solvent for the LiFSI salt, i.e. the LiFSI may have a solubility of greater than or equal to 10% by weight relative to the total weight of the sum LiFSI plus solvent; and/or
- sparingly soluble in water, i.e. it has a solubility of less than or equal to 1% by weight relative to the total weight of the sum solvent plus water.

According to one embodiment, the organic solvent S2 is chosen from the group constituted of esters, nitriles, ethers, chlorinated solvents and aromatic solvents, and mixtures thereof. Preferably, the solvent S2 is chosen from ethers and esters, and mixtures thereof. For example, mention may be made of diethyl carbonate, methyl t-butyl ether, cyclopentyl methyl ether, ethyl acetate, propyl acetate, butyl acetate, dichloromethane, tetrahydrofuran, acetonitrile and diethyl ether, and mixtures thereof. Preferably, the solvent S2 is chosen from methyl t-butyl ether, cyclopentyl methyl ether, ethyl acetate, propyl acetate and butyl acetate, and mixtures thereof.

Preferably, the organic solvent is butyl acetate.

The extraction step b) is repeated at least once, preferably from one to ten times and in particular four times. The organic phases may then be pooled into a single phase before step c).

Preferably, in the process according to the invention, the organic phases extracted during step b) are not pooled with the organic phase(s) obtained during step a).

For each extraction, the mass amount of organic solvent S2 used may range between ⅙ and 1 times the mass of the aqueous phase. Preferably, the organic solvent S2/water mass ratio, during an extraction of step b), ranges from 1/6 to 1/1, the number of extractions ranging in particular from 2 to 10.

Preferably, during the extraction step b), the organic solvent S2 is added to the aqueous solution obtained on conclusion of step a) (and of the optional step a')).

According to one embodiment, the mass content of LiFSI in solution in the organic phase is between 5% and 35%, preferably between 10% and 25% by mass, relative to the total mass of the solution.

The process may comprise a concentration step c') (pre-concentration) between step b) and step c), preferably to obtain a solution of LiFSI in the organic solvent S2 comprising a mass content of LiFSI of between 20% and 60% and preferably between 30% and 50% by mass relative to the total mass of the solution.

The preconcentration step c') may be performed at a temperature ranging from 25° C. to 60° C., preferably from 25° C. to 45° C., optionally under reduced pressure, for example at a pressure below 50 mbar abs, in particular at a pressure below 30 mbar abs.

The preconcentration step c') may be performed with a rotary evaporator under reduced pressure, especially at 40° C. and at a pressure below 30 mbar abs.

According to one embodiment, step c) of the process according to the invention consists in concentrating the solution of LiFSI in the organic solvent S2 (obtained especially on conclusion of step b) or of the optional step c')).

According to the invention, the concentration step c) may be performed at a pressure of between $10^{-2}$ mbar abs and 5 mbar abs, preferably between $5\times10^{-2}$ mbar abs and 2 mbar abs, preferentially between $5\times10^{-1}$ and 2 mbar abs, even more preferentially between 0.1 and 1 mbar abs and in particular between 0.4 and 0.6 mbar abs. In particular, step c) is performed at 0.5 mbar abs or at 0.1 mbar.

According to one embodiment, step c) is performed at a temperature of between 30° C. and 95° C., preferably between 30° C. and 90° C., preferentially between 40° C. and 85° C., in particular between 60° C. and 80° C. or between 45° C. and 65° C., advantageously at 60° C. or at 80° C.

According to one embodiment, step c) is performed with a residence time of less than or equal to 15 minutes, preferentially less than 10 minutes, preferably less than or equal to 5 minutes and advantageously less than or equal to 3 minutes.

In the context of the invention, and unless otherwise mentioned, the term “residence time” means the time which elapses between the entry of the solution of lithium bis(fluorosulfonyl)imide salt (in particular obtained on conclusion of the abovementioned step b)) into the evaporator and the exit of the first drop of the solution.

According to a preferred embodiment, the temperature of the condenser of the short-path thin-film evaporator is between −50° C. and 5° C., preferably between −35° C. and 5° C. In particular, the condenser temperature is −5° C.

The short-path thin-film evaporators according to the invention are also known under the name “wiped-film short-path” (WFSP). They are typically referred to as such since the vapors generated during the evaporation cover a short path (travel a short distance) before being condensed in the condenser.

Among the short-path thin-film evaporators, mention may be made especially of the evaporators sold by the companies Buss SMS Ganzler ex Luwa AG, UIC GmbH or VTA Process.

Typically, the short-path thin-film evaporators may comprise a condenser for the solvent vapors placed inside the machine itself (in particular at the center of the machine), unlike other types of thin-film evaporator (which are not short-path evaporators) in which the condenser is outside the machine.

In this type of machine, the formation of a thin film, of product to be distilled, on the hot inner wall of the evaporator may typically be ensured by continuous spreading over the evaporation surface with the aid of mechanical means specified below.

The evaporator may especially be equipped, at its center, with an axial rotor on which are mounted the mechanical means that allow the formation of the film on the wall. They may be rotors equipped with fixed vanes, lobed rotors with three or four vanes made of flexible or rigid materials, distributed over the entire height of the rotor, or rotors equipped with mobile vanes, paddles, brushes, doctor blades or guided scrapers. In this case, the rotor may be constituted by a succession of pivot-articulated paddles mounted on a shaft or axle by means of radial supports. Other rotors may be equipped with mobile rollers mounted on secondary axles and said rollers are held tight against the wall by centrifugation. The spin speed of the rotor, which depends on the size of the machine, may be readily determined by a person skilled in the art. The various spindles may be made of various materials: metallic, for example steel, steel alloy (stainless steel), aluminum, or polymeric, for example polytetrafluoroethylene PTFE, or glass materials (enamel); metallic materials coated with polymeric materials.

According to one embodiment, the solution of LiFSI salt is introduced into the short-path thin-film evaporator with a flow rate of between 700 g/h and 1200 g/h, preferably between 900 g/h and 1100 g/h for an evaporation surface of 0.04 $m^2$.

The process according to the invention advantageously makes it possible to obtain an LiFSI salt in particular having a water content of less than or equal to 45 ppm by weight, preferably less than or equal to 40 ppm by weight, and in particular a sulfate content of less than or equal to 100 ppm, preferably less than or equal to 50 ppm. The process according to the invention advantageously allows the production of an LiFSI salt that is compatible with applications in electrolytes for Li-ion batteries.

According to the invention, on conclusion of the abovementioned step c), the LiFSI may be obtained in solid form, and in particular in crystalline form, or in the form of a concentrated solution, said concentrated solution comprising less than 10% by weight of residual solvent relative to the total weight of said concentrated solution.

According to one embodiment, the process according to the invention also comprises a step d) of crystallization of the lithium bis(fluorosulfonyl)imide salt obtained on conclusion of the abovementioned step c).

Preferably, during step d), the LiFSI is crystallized under cold conditions, especially at a temperature of less than or equal to 25° C.

Preferably, step d) of crystallization of the LiFSI is performed in an organic solvent S3 (crystallization solvent) chosen from chlorinated solvents, for instance dichloromethane, and aromatic solvents, for instance toluene, in particular at a temperature of less than or equal to 25° C. Preferably, the LiFSI crystallized on conclusion of step d) is recovered by filtration.

The process according to the invention may comprise intermediate steps between the abovementioned steps of the process. Preferably, the process does not comprise intermediate steps between the abovementioned steps.

According to one embodiment, the process for drying and purifying a lithium bis(fluorosulfonyl)imide salt in solution in an organic solvent S1, according to the invention, comprises the following four steps:

a) addition of deionized water to the solution of LiFSI in an organic solvent S1, allowing extraction of the LiFSI salt into water, this step preferably being repeated at least once;

a') optional concentration of said aqueous solution of said salt;

b) extraction of said LiFSI salt using an organic solvent S2 which preferably forms an azeotropic mixture with water;

c) concentration of the LiFSI by evaporation of said organic solvent S2 in particular entraining the water with the solvent; and d) crystallization of the bis(fluorosulfonyl)imide salt.

According to one embodiment, the drying and purification process according to the invention comprises the following steps:

a) addition of deionized water to the solution of LiFSI in the organic solvent S1, especially in butyl acetate, to dissolve and extract the lithium bis(fluorosulfonyl) imide salt, forming an aqueous solution of said salt, this step preferably being repeated at least once;
   the mass content of LiFSI in the organic solvent S1 in particular being between 5% and 55%;

a') optional concentration of the aqueous solution obtained on conclusion of step a), to obtain an aqueous solution of LiFSI with an LiFSI content of between 20% and 80%, preferably between 30% and 65%;

b) extraction of the lithium bis(fluorosulfonyl)imide salt from said aqueous solution, with an organic solvent S2 which preferably forms an azeotropic mixture with water, this step being repeated at least once;

c') optional step of concentration of the organic solution obtained on conclusion of step b), to obtain an organic solution with a mass content of LiFSI of between 20% and 60%;

c) concentration of the lithium bis(fluorosulfonyl)imide salt by evaporation of said organic solvent S2 and of the water, in a short-path thin-film evaporator, under the following conditions:
   temperature of between 30° C. and 95° C., preferably between 30° C. and 90° C., preferentially between 40° C. and 85° C., in particular between 60° C. and 80° C., advantageously at 60° C. or at 80° C.;
   pressure of between $10^{-3}$ mbar abs and 5 mbar abs, in particular between $5\times10^{-1}$ and 2 mbar abs, advantageously at 0.5 mbar abs or at 0.1 mbar abs;
   residence time of less than or equal to 15 min, preferentially less than or equal to 5 min and preferably less than or equal to 3 min;

d) optional crystallization of the lithium bis(fluorosulfonyl)imide salt in an organic solvent S3 chosen from chlorinated solvents, for instance dichloromethane, and aromatic solvents, for instance toluene, at a temperature of less than or equal to 25° C.;

d') optional filtration to recover the LiFSI.

According to one embodiment, the drying and purification process according to the invention comprises the following steps:

a) addition of deionized water to the solution of LiFSI in the organic solvent S1, especially in butyl acetate, to dissolve and extract the lithium bis(fluorosulfonyl) imide salt, forming an aqueous solution of said salt, this step preferably being repeated at least once;
   the mass content of LiFSI in the organic solvent S1 in particular being between 5% and 55%;

a') optional concentration of the aqueous solution obtained on conclusion of step a), to obtain an aqueous solution of LiFSI with an LiFSI content of between 20% and 80%, preferably between 30% and 65%;

b) extraction of the lithium bis(fluorosulfonyl)imide salt from said aqueous solution, with an organic solvent S2 which preferably forms an azeotropic mixture with water, this step being repeated at least once;

c') optional step of concentration of the organic solution obtained on conclusion of step b), to obtain an organic solution with a mass content of LiFSI of between 20% and 60%;

c) concentration of the lithium bis(fluorosulfonyl)imide salt by evaporation of said organic solvent S2 and of the water, in a short-path thin-film evaporator, under the following conditions:
   temperature of between 30° C. and 95° C., preferably between 30° C. and 90° C., preferentially between 40° C. and 85° C., in particular between 60° C. and 80° C., advantageously at 60° C. or at 80° C.;
   pressure of between $10^{-3}$ mbar abs and 5 mbar abs, in particular between $5\times10^{-1}$ and 2 mbar abs, advantageously at 0.5 mbar abs or at 0.1 mbar abs;
   residence time of less than or equal to 15 min, preferentially less than or equal to 5 min and preferably less than or equal to 3 min;

d) crystallization of the lithium bis(fluorosulfonyl)imide salt in an organic solvent S3 chosen from chlorinated solvents, for instance dichloromethane, and aromatic solvents, for instance toluene, at a temperature of less than or equal to 25° C.;

d') filtration to recover the LiFSI.

According to one embodiment, the drying and purification process according to the invention comprises the following steps:

a) addition of deionized water to the solution of LiFSI in the organic solvent S1, especially in butyl acetate, to dissolve and extract the lithium bis(fluorosulfonyl) imide salt, forming an aqueous solution of said salt, this step preferably being repeated at least once;
   the mass content of LiFSI in the organic solvent S1 in particular being between 5% and 55%;

a') concentration of the aqueous solution obtained on conclusion of step a), to obtain an aqueous solution of LiFSI with an LiFSI content of between 20% and 80%, preferably between 30% and 65%, preferably at a temperature of 40° C. and at a pressure of less than or equal to 50 mbar abs;

b) extraction of the lithium bis(fluorosulfonyl)imide salt from said aqueous solution, with an organic solvent S2 which preferably forms an azeotropic mixture with water, this step being repeated at least once;

c') optional step of concentration of the organic solution obtained on conclusion of step b), to obtain an organic solution with a mass content of LiFSI of between 20% and 60%;

c) concentration of the lithium bis(fluorosulfonyl)imide salt by evaporation of said organic solvent S2 and of the water, in a short-path thin-film evaporator, under the following conditions:

temperature of between 30° C. and 95° C., preferably between 30° C. and 90° C., preferentially between 40° C. and 85° C., in particular between 60° C. and 80° C., advantageously at 60° C. or 80° C.;

pressure of between $10^{-3}$ mbar abs and 5 mbar abs, in particular between $5\times10^{-1}$ and 2 mbar abs, advantageously at 0.5 mbar abs or at 0.1 mbar abs;

residence time of less than or equal to 15 min, preferentially less than or equal to 5 min and preferably less than or equal to 3 min;

d) crystallization of the lithium bis(fluorosulfonyl)imide salt in an organic solvent S3 chosen from chlorinated solvents, for instance dichloromethane, and aromatic solvents, for instance toluene, at a temperature of less than or equal to 25° C.;

d') filtration to recover the LiFSI.

The process according to the invention advantageously makes it possible to obtain LiFSI comprising a water content of less than or equal to 45 ppm, in particular less than or equal to 40 ppm by mass relative to the total mass of said LiFSI.

Preferably, the process according to the invention leads to an LiFSI comprising a mass proportion of water of, for example, between 5 and 45 ppm, between 8 and 45 ppm, between 9 and 45 ppm, between 10 and 45 ppm, between 12 and 45 ppm, between 15 and 45 ppm, between 20 and 45 ppm, between 25 and 45 ppm, between 30 and 45 ppm, between 5 and 40, between 8 and 40 ppm, between 9 and 40, between 10 and 40 ppm, between 12 and 40 ppm, between 15 and 40 ppm, between 20 and 40 ppm, between 25 and 40 ppm, or between 30 and 40 ppm by mass relative to the total mass of said salt.

Preferably, the process according to the invention leads to an LiFSI salt in which the mass proportion of sulfate ions is, for example, less than or equal to 100 ppm, less than or equal to 90 ppm, less than or equal to 80 ppm, less than or equal to 70 ppm, less than or equal to 60 ppm, less than or equal to 50 ppm, less than or equal to 40 ppm, or less than or equal to 30 ppm, less than or equal to 20 ppm, less than or equal to 15 ppm, or less than or equal to 10 ppm by mass relative to the total mass of said salt.

Preferably, the process according to the invention leads to an LiFSI salt comprising a mass proportion of sulfate ions of, for example, between 2 and 100 ppm, between 2 and 90 ppm, between 2 and 80 ppm, between 2 and 70 ppm, between 2 and 60 ppm, between 2 and 50 ppm, between 2 and 40 ppm, between 2 and 30 ppm, between 2 and 20 ppm, between 2 and 15 ppm, between 2 and 10 ppm, between 3 and 90 ppm, between 3 and 80 ppm, between 3 and 70 ppm, between 3 and 60 ppm, between 3 and 50 ppm, between 3 and 40 ppm, between 3 and 30 ppm, between 3 and 20 ppm, between 3 and 15 ppm, between 3 and 10 ppm, between 4 and 100 ppm, between 4 and 90 ppm, between 4 and 80 ppm, between 4 and 70 ppm, between 4 and 60 ppm, between 4 and 50 ppm, between 4 and 40 ppm, between 4 and 30 ppm, between 4 and 20 ppm, between 4 and 15 ppm, between 4 and 10 ppm, between 5 and 100 ppm, between 5 and 90 ppm, between 5 and 80 ppm, between 5 and 70 ppm, between 5 and 60 ppm, between 5 and 50 ppm, between 5 and 40 ppm, between 5 and 30 ppm, between 5 and 20 ppm, between 5 and 15 ppm, or between 5 and 10 ppm by mass relative to the total mass of said salt.

Advantageously, the process according to the invention leads to an LiFSI salt comprising a mass content of $Cl^-$ of less than or equal to 50 ppm, preferentially less than or equal to 40 ppm, in particular less than or equal to 30 ppm, especially less than or equal to 25 ppm by mass relative to the total mass of said salt.

The process according to the invention advantageously makes it possible to obtain an LiFSI in which the mass contents of other impurities are as follows: $F^-\leq200$ ppm, $FSO_3Li^-\leq200$ ppm, $FSO_2NH_2\leq200$ ppm, $CO_3^{2-}\leq50$ ppm, $ClO_3^-\leq50$ ppm, $ClO_4^-\leq50$ ppm, $NO_2^-\leq50$ ppm, $NO_3^-\leq50$ ppm, Si≤40 ppm, Mg≤10 ppm, Fe≤10 ppm, Ca≤10 ppm, Pb 10 ppm, Cu≤10 ppm, Cr≤10 ppm, Ni≤10 ppm, Al≤10 ppm, Zn≤10 ppm, and Na≤10 ppm.

According to one embodiment, the process according to the invention advantageously leads to an LiFSI salt comprising:

a mass content of water of less than or equal to 45 ppm, preferably less than or equal to 40 ppm, preferably between 5 and 40 ppm, preferably between 8 and 40 ppm, in particular between 10 and 40 ppm, preferentially between 12 and 40 ppm, for example between 15 and 40 ppm, especially between 20 and 40 ppm, advantageously between 25 and 40 ppm and even more advantageously between 30 and 40 ppm;

a mass content of sulfate ions of less than or equal to 100 ppm, less than or equal to 90 ppm, less than or equal to 80 ppm, less than or equal to 70 ppm, less than or equal to 60 ppm, less than or equal to 50 ppm, less than or equal to 40 ppm, or less than or equal to 30 ppm, less than or equal to 20 ppm, less than or equal to 15 ppm, or less than or equal to 10 ppm by mass relative to the total mass of said salt; and a mass content of $Cl^-$ of less than or equal to 50 ppm, preferentially less than or equal to 40 ppm, in particular less than or equal to 30 ppm, especially less than or equal to 25 ppm by mass relative to the total mass of said salt.

The present invention also relates to an LiFSI salt which may be obtained according to the purification and drying process as described previously, and the uses thereof in Li-ion battery electrolytes.

The invention also relates to a process for manufacturing a lithium bis(fluorosulfonyl)imide salt, which comprises, in addition to steps i) to iv) mentioned above, steps a) to d) of the drying and purification process according to the invention.

According to a second aspect, the invention relates to a process for preparing a lithium bis(fluorosulfonyl)imide salt, which comprises, upstream of steps a) to d) of the above-mentioned drying and purification process, the following steps i) to iv): i) synthesis of bis(chlorosulfonyl)imide;

ii) fluorination of bis(chlorosulfonyl)imide to bis(fluorosulfonyl)imide;

iii) preparation of the alkali metal or alkaline-earth metal salt of bis(fluorosulfonyl)imide by neutralization of the bis(fluorosulfonyl)imide;

iv) cation exchange to obtain a lithium bis(fluorosulfonyl) imide salt.

According to one embodiment, the lithium bis(fluorosulfonyl)imide salt is prepared as described below.

According to one embodiment, the present invention relates to a process for preparing a lithium bis(fluorosulfonyl)imide salt, comprising the following steps:

i) synthesis of bis(chlorosulfonyl)imide from sulfamic acid;

ii) fluorination of bis(chlorosulfonyl)imide to bis(fluorosulfonyl)imide;

iii) preparation of the alkali metal or alkaline-earth metal salt of bis(fluorosulfonyl)imide by neutralization of the bis(fluorosulfonyl)imide, in particular using an aqueous solution of a base chosen from alkali metal or alkaline-earth metal carbonates, and alkali metal or alkaline-earth metal hydroxides;

iv) cation exchange to obtain a lithium bis(fluorosulfonyl) imide salt;

v) abovementioned drying and purification process according to the invention, comprising steps a) to d) as described above.

Step i): Synthesis of bis(chlorosulfonyl)imide

Compound (A) containing two chlorosulfonyl groups (bis(chlorosulfonyl)imide) may be prepared from sulfamic acid, in particular according to the following scheme:

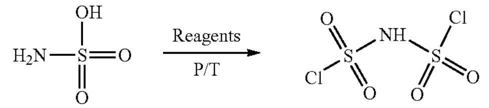

(A)

According to one embodiment, the reaction temperature is between 30° C. and 150° C.

According to one embodiment, the reaction time is between 1 hour and 7 days.

According to one embodiment, the reaction may be performed at a pressure of between 1 bar absolute and 7 bar absolute.

According to one embodiment, the reagents may be chlorosulfonic acid ($ClSO_3H$), and a chlorinating agent chosen from thionyl chloride ($SOCl_2$), oxalyl chloride $(COCl)_2$, phosphorus pentachloride (PCls), phosphonyl trichloride ($PCl_3$), phosphoryl trichloride ($POCl_3$), and mixtures thereof.

According to the invention, a catalyst chosen from a tertiary amine such as methylamine, triethylamine, diethylmethylamine; pyridine; and 2,6-lutidine, may be added to accelerate the reaction.

According to one embodiment, the mole ratio between the chlorosulfonic acid and the sulfamic acid is between 1 and 5.

According to one embodiment, the mole ratio between the chlorinating agent and the sulfamic acid is between 2 and 5.

According to one embodiment, the reagents may be sulfamic acid, and sulfuric acid or oleum, and a chlorinating agent chosen from thionyl chloride ($SOCl_2$), oxalyl chloride $(COCl)_2$, phosphorus pentachloride (PCls), phosphonyl trichloride ($PCl_3$), phosphoryl trichloride ($POCl_3$), and mixtures thereof. A catalyst chosen from a tertiary amine such as methylamine, triethylamine, diethylmethylamine, pyridine and 2,6-lutidine may be added to accelerate the reaction. According to one embodiment, the mole ratio between the sulfuric acid (or the oleum) and the sulfamic acid is between 0.7 and 5. According to one embodiment, the mole ratio between the chlorinating agent and the sulfamic acid is between 3 and 10.

Step ii): Fluorination of bis(chlorosulfonyl)imide to bis (fluorosulfonyl)imide

The process for preparing the LiFSI salt may comprise at least one step of reacting a compound of formula (A), obtained especially on conclusion of the abovementioned step i), with anhydrous hydrofluoric acid, in at least one organic solvent.

Step ii) especially allows the fluorination of compound (A) to a compound (B) as described below.

The fluorination step with anhydrous hydrofluoric acid, according to the present invention, may be represented schematically as follows:

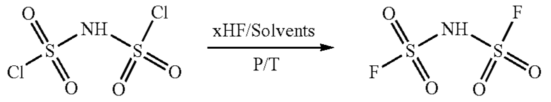

(A) (B)

Preferably, the solvent used in the abovementioned step ii) is an organic solvent, in particular having a donor number of between 1 and 70, advantageously between 5 and 65. The donor number of a solvent represents the value $-\Delta H$, $\Delta H$ being the enthalpy of the interaction between the solvent and antimony pentachloride (Journal of Solution Chemistry, vol. 13, No. 9, 1984). Organic solvents that may especially be mentioned include esters, nitriles or dinitriles, ethers or diethers, amines and phosphines. Combinations thereof may also be used as organic solvent.

Methyl acetate, ethyl acetate, butyl acetate, acetonitrile, propionitrile, isobutyronitrile, glutaronitrile, dioxane, tetrahydrofuran, triethylamine, tripropylamine, diethylisopropylamine, pyridine, trimethylphosphine, triethylphosphine, diethylisopropylphosphine and mixtures thereof may be suitable for use as solvents.

Preferably, the solvent is a polar aprotic organic solvent.

Preferably, the organic solvent is dioxane.

The reaction step with anhydrous hydrofluoric acid may be performed at a temperature T preferably between 0° C. and the boiling point of the solvent or solvent mixture used. Advantageously, this temperature is between 5° C. and the boiling point of the solvent or solvent mixture.

The reaction step with anhydrous hydrofluoric acid may be performed at a pressure P preferably between 0 and 16 bar absolute.

This step is preferably performed by dissolving the compound of formula (A) in the solvent or the solvent mixture, prior to the step of reaction with anhydrous HF.

The mass ratio between the compound of formula (A) and the solvent or solvent mixture is preferably between 0.001 and 10, and advantageously between 0.005 and 5.

According to one embodiment, HF is introduced into the reaction medium preferably in gaseous form.

The mole ratio x between the HF and the compound of formula (A) used is preferably between 2 and 10, and advantageously between 2 and 5.

The step of reaction with HF may be performed in a closed medium or in an open medium; preferably, step iii) is performed in an open medium with evolution of HCl in gaseous form.

The use of a donor solvent in particular allows the formation of a solvent-HF complex, and thus to enhance the nucleophilicity of the fluorine atom. The use of such a complex advantageously allows mild fluorination of the compound of formula (A), thus avoiding spurious cleavage reactions.

Step iii): Preparation of the bis(fluorosulfonyl)imide salt by neutralization of the bis(fluorosulfonyl)imide According to one embodiment, the process for preparing the lithium bis(fluorosulfonyl)imide salt comprises, on conclusion of the fluorination step ii), a neutralization step (step iii)).

According to one embodiment, the neutralization step is performed using an aqueous solution of a base chosen from alkali metal or alkaline-earth metal carbonates of formula $MCO_3.nH_2O$ or alkali metal or alkaline-earth metal hydroxides $MOH \cdot nH_2O$ with M representing a monovalent alkali metal or alkaline-earth metal cation. Preferably, MOH represents NaOH, KOH RbOH or CsOH. Preferably, $MCO_3$ represents $Na_2CO_3$, $K_2CO_3$, $Rb_2CO_3$ or $Cs_2CO_3$.

Preferably, M does not represent Li.

Preferably, the base used is not a base comprising lithium. Preferably, the base used comprises potassium.

The abovementioned step iii) is especially performed according to the following scheme:

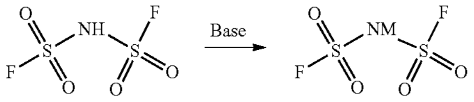

(B) (C)

Preferably, the neutralization step leads to a solution of (C) with a pH of greater than 4.

In particular, the residual HF and/or the residual HCl dissolved in the solvent reacts with the base described above, so as to form an alkali metal or alkaline-earth metal fluoride MF (or a mixture of fluorides MF), or, respectively, an alkali metal or alkaline-earth metal chloride MCl (or a mixture of chlorides MCl). The neutralization reaction may be performed, for example, by adding an aqueous solution of the chosen base. The base/compound (B) mole ratio may be, for example, from 1 to 5 when the base is a hydroxide, or from 0.5 to 5 (or from 2 to 10) when the base is a carbonate. The reaction temperature may be, for example, between −10° C. and 40° C.

According to the invention, the aqueous solution comprising compound (C) may then be filtered.

Depending on the nature of the alkali metal or alkaline-earth metal, the product (C) may be present in the filtrate or in the filtered solid. The alkali metal or alkaline-earth metal fluorides are especially present in the filtered solid, but may also be found in the filtrate.

Two different steps for recovering the product (C) may be used on conclusion of step iii), depending on where the product (C) is predominantly found: step R1 or step R2.

According to a first recovery method (step R1), when the product (C) is predominantly contained in the aqueous phase (filtrate), the aqueous phase may be extracted with an organic solvent chosen from the following families: esters, nitriles, ethers, chlorinated solvents, aromatic solvents, and mixtures thereof. Preferably, the organic solvent is chosen from dichloromethane, ethyl acetate, butyl acetate, tetrahydrofuran, acetonitrile and diethyl ether, and mixtures thereof. In particular, it is butyl acetate.

For each extraction, the mass amount of organic solvent used may range between 1/6 and 1 times the mass of the aqueous phase. The number of extractions may be between 2 and 10. Preferably, the organic phase resulting from the extraction has a mass content of bis(fluorosulfonyl)imide salt ranging from 5% to 50% by mass. The organic phase may then be concentrated to reach a bis(fluorosulfonyl)imide salt concentration of between 5% and 55%, preferably between 10% and 50% by mass, said concentration possibly being achieved by any evaporation means known to those skilled in the art.

According to a second recovery method (step R2), when it is mainly contained in the cake (filtered solid), the product (C) may be recovered by washing the cake with an organic solvent chosen from the following families: esters, nitriles, ethers, chlorinated solvents, aromatic solvents, and mixtures thereof. Preferably, the organic solvent is chosen from dichloromethane, ethyl acetate, butyl acetate, tetrahydrofuran, acetonitrile and diethyl ether, and mixtures thereof. In particular, it is butyl acetate.

The mass amount of organic solvent used may range between 1 and 10 times the weight of the cake. The total amount of organic solvent intended for the washing may be used in a single portion or in several portions for the purpose especially of optimizing the dissolution of the product (C). Preferably, the organic phase resulting from the extraction has a mass content of LiFSI salt ranging from 5% to 50% by mass. The organic phase may then be concentrated to reach a bis(fluorosulfonyl)imide salt concentration of between 5% and 55%, preferably between 10% and 50% by mass, said concentration possibly being achieved by any evaporation means known to those skilled in the art.

Preferably, compound (C) is such that M=K.

Step iv): Cation Exchange to Obtain a Lithium Bis(Fluorosulfonyl)Imide Salt

A final cation-exchange step may be performed, for example according to the following scheme:

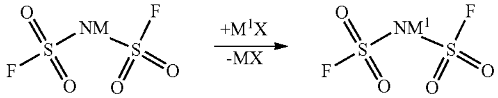

(C) (D)

in which $M^1$=Li and X may be a fluoride, a chloride, a carbonate, a hydroxide, a sulfate, a chlorate, a perchlorate, a nitrite or a nitrate.

The salt $M^1X$ may be dissolved in a polar organic solvent chosen from the following families: alcohols, nitriles and carbonates. Examples that may especially be mentioned include methanol, ethanol, acetonitrile, dimethyl carbonate and ethyl methyl carbonate.

This solution may be poured into a solution of product (C) in an organic solvent chosen from the following families: esters, nitriles, ethers, chlorinated solvents, aromatic solvents, and mixtures thereof. Preferably, the solvent is chosen from dichloromethane, ethyl acetate, butyl acetate, tetrahydrofuran, acetonitrile and diethyl ether, and mixtures thereof. Preferably, the solvent is butyl acetate.

The mole ratio of product (C) relative to $M^1X$ may vary: it may be at least equal to 1 and less than 5. Preferably, the mole ratio (C)/$M^1X$ is between 1.2 and 2.

The reaction medium may be left stirring for between 1 and 24 hours at a temperature of between, for example, 0 and 50° C. At the end of the reaction, the reaction medium may be filtered to remove the precipitated MX formed. The filtrate may then be concentrated to remove the solvent for the salt $M^1X$ with a boiling point of less than or equal to 90° C. A precipitate of MX may then form again and may be removed by filtration. By means of this purification, the relative mass content of the impurity M relative to the product (D) is advantageously less than or equal to 500 ppm.

According to a first embodiment, the solution of the product (D) obtained after the filtration(s) is evaporated, with a thin-film evaporator, with an atomizer, with a rotary evaporator, or with any other apparatus for solvent evaporation.

Compound (D) may then be subjected to the purification process according to the invention described above, especially comprising the following steps:

a) addition of deionized water to dissolve and extract the lithium bis(fluorosulfonyl)imide salt, forming an aqueous solution of said salt;

a') optional concentration of said aqueous solution of said salt;

b) extraction of the lithium bis(fluorosulfonyl)imide salt from said aqueous solution, with an organic solvent S2, said solvent S2 preferably forming an azeotropic mixture with water, this step being repeated at least once;

c) concentration of the lithium bis(fluorosulfonyl)imide salt by evaporation of said organic solvent S2 and of the water, in a short-path thin-film evaporator, under the following conditions:

temperature between 30° C. and 95° C., preferably between 30° C. and 90° C., preferentially between 40° C. and 85° C.;

pressure between $10^3$ mbar abs and 5 mbar abs;

residence time of less than or equal to 15 minutes, preferably less than or equal to 10 minutes and preferably less than or equal to 5 minutes;

d) optionally, crystallization of the lithium bis(fluorosulfonyl)imide salt.

The product (D) purified according to the process of the invention is advantageously in the form of a white powder.

The present invention also relates to a lithium bis(fluorosulfonyl)imide salt, comprising:

a mass content of water of between 5 and 45 ppm, preferably between 5 and 40 ppm by mass relative to the total mass of said salt; and a mass content of sulfate ions of less than or equal to 100 ppm, preferably less than or equal to 90 ppm, less than or equal to 80 ppm, less than or equal to 70 ppm, less than or equal to 60 ppm, less than or equal to 50 ppm, less than or equal to 40 ppm, or less than or equal to 30 ppm, less than or equal to 20 ppm, less than or equal to 15 ppm, or less than or equal to 10 ppm by mass relative to the total mass of said salt.

The present invention also relates to a composition C comprising:

at least 99.80%, preferably at least 99.85%, advantageously at least 99.90% and preferentially at least 99.95% by weight of lithium bis(fluorosulfonyl)imide salt (LiFSI) relative to the total weight of said composition C;

between 5 ppm and 45 ppm, preferably between 5 and 40 ppm by mass of water relative to the total mass of composition C; and a mass content of sulfate ions of less than or equal to 100 ppm, preferably less than or equal to 90 ppm, less than or equal to 80 ppm, less than or equal to 70 ppm, less than or equal to 60 ppm, less than or equal to 50 ppm, less than or equal to 40 ppm, or less than or equal to 30 ppm, less than or equal to 20 ppm, less than or equal to 15 ppm, or less than or equal to 10 ppm by mass relative to the total mass of composition C.

In the LiFSI salt according to the invention (or in composition C according to the invention), the mass proportion of water may be, for example, between 8 and 45 ppm, between 9 and 45 ppm, between 10 and 45 ppm, between 11 and 45 ppm, between 12 and 45 ppm, between 13 and 45 ppm, between 14 and 45 ppm, between 15 and 45 ppm, between 16 and 45 ppm, between 17 and 45 ppm, between 18 and 45 ppm, between 19 and 45 ppm, between 20 and 45 ppm, between 21 and 45 ppm, between 22 and 45 ppm, between 23 and 45 ppm, between 24 and 45 ppm, between 25 and 45 ppm, between 26 and 45 ppm, between 27 and 45 ppm, between 28 and 45 ppm, between 29 and 45 ppm, between 30 and 45 ppm, between 8 and 40 ppm, between 9 and 40 ppm, between 10 and 40 ppm, between 11 and 40 ppm, between 12 and 40 ppm, between 13 and 40 ppm, between 14 and 40 ppm, between 15 and 40 ppm, between 16 and 40 ppm, between 17 and 40 ppm, between 18 and 40 ppm, between 19 and 40 ppm, between 20 and 40 ppm, between 21 and 40 ppm, between 22 and 40 ppm, between 23 and 40 ppm, between 24 and 40 ppm, between 25 and 40 ppm, between 26 and 40 ppm, between 27 and 40 ppm, between 28 and 40 ppm, between 29 and 40 ppm or between 30 and 40 ppm by mass relative to the total mass of said salt (or, respectively, relative to the total mass of composition C).

In the LiFSI salt according to the invention (or in composition C according to the invention), the mass proportion of sulfate ions may be, for example, between 2 and 100 ppm, between 2 and 90 ppm, between 2 and 80 ppm, between 2 and 70 ppm, between 2 and 60 ppm, between 2 and 50 ppm, between 2 and 40 ppm, between 2 and 30 ppm, between 2 and 20 ppm, between 2 and 15 ppm, between 2 and 10 ppm, between 3 and 90 ppm, between 3 and 80 ppm, between 3 and 70 ppm, between 3 and 60 ppm, between 3 and 50 ppm, between 3 and 40 ppm, between 3 and 30 ppm, between 3 and 20 ppm, between 3 and 15 ppm, between 3 and 10 ppm, between 4 and 100 ppm, between 4 and 90 ppm, between 4 and 80 ppm, between 4 and 70 ppm, between 4 and 60 ppm, between 4 and 50 ppm, between 4 and 40 ppm, between 4 and 30 ppm, between 4 and 20 ppm, between 4 and 15 ppm, between 4 and 10 ppm, between 5 and 100 ppm, between 5 and 90 ppm, between 5 and 80 ppm, between 5 and 70 ppm, between 5 and 60 ppm, between 5 and 50 ppm, between 5 and 40 ppm, between 5 and 30 ppm, between 5 and 20 ppm, between 5 and 15 ppm, or between 5 and 10 ppm by mass relative to the total mass of said salt (or, respectively, relative to the total mass of composition C).

According to one embodiment, the LiFSI salt (or composition C according to the invention) comprises a content of $Cl^-$ ions of less than or equal to 50 ppm, preferentially less than or equal to 40 ppm, in particular less than or equal to 30 ppm, especially less than or equal to 25 ppm by mass relative to the total mass of said salt (or, respectively, relative to the total mass of composition C).

In particular, the LiFSI salt according to the invention (or composition C according to the invention) comprises the following impurities: $F^- \leq 200$ ppm (preferably $\leq 50$ ppm), $FSO_3Li \leq 200$ ppm, $FSO_2NH_2 \leq 200$ ppm, $CO_3^{2-} \leq 50$ ppm, $ClO_3^- \leq 50$ ppm, $ClO_4^- \leq 50$ ppm, $NO_2^- \leq 50$ ppm, $NO_3^- \leq 50$ ppm, $Si \leq 40$ ppm, $Mg \leq 10$ ppm, $Fe \leq 10$ ppm, $Ca \leq 10$ ppm, $Pb \leq 10$ ppm, $Cu \leq 10$ ppm, $Cr \leq 10$ ppm, $Ni \leq 10$ ppm, $Al \leq 10$ ppm, $Zn \leq 110$ ppm, and $Na \leq 10$ ppm.

According to a preferred embodiment, the LiFSI according to the invention (or composition C according to the invention) comprises:

a mass content of water of between 5 and 45 ppm, and in particular between, for example, 8 and 45 ppm, between 9 and 45 ppm, between 10 and 45 ppm, between 11 and 45 ppm, between 12 and 45 ppm, between 13 and 45 ppm, between 14 and 45 ppm, between 15 and 45 ppm, between 16 and 45 ppm, between 17 and 45 ppm, between 18 and 45 ppm, between 19 and 45 ppm, between 20 and 45 ppm, between 21 and 45 ppm, between 22 and 45 ppm, between 23 and 45, between 24 and 45 ppm, between 25 and 45, between 26 and 45 ppm, between 27 and 45 ppm, between 28 and 45 ppm, between 29 and 45 ppm, between 30 and 45 ppm, or between 30 and 40 ppm by mass relative to the total mass of said salt (or, respectively, relative to the total mass of composition C);

a mass content of sulfate ions of less than or equal to 100 ppm, for example between 2 and 100 ppm, between 2 and 90 ppm, between 2 and 80 ppm, between 2 and 70 ppm, between 2 and 60 ppm, between 2 and 50 ppm, between 2 and 40 ppm, between 2 and 30 ppm, between 2 and 20 ppm, between 2 and 15 ppm, between 2 and 10 ppm, between 3 and 90 ppm, between 3 and 80 ppm, between 3 and 70 ppm, between 3 and 60 ppm, between 3 and 50 ppm, between 3 and 40 ppm, between 3 and 30 ppm, between 3 and 20 ppm, between 3 and 15 ppm, between 3 and 10 ppm, between 4 and 100 ppm, between 4 and 90 ppm, between 4 and 80 ppm, between 4 and 70 ppm, between 4 and 60 ppm, between 4 and 50 ppm, between 4 and 40 ppm, between 4 and 30 ppm, between 4 and 20 ppm, between 4 and 15 ppm, between 4 and 10 ppm, between 5 and 100 ppm, between 5 and 90 ppm, between 5 and 80 ppm, between 5 and 70 ppm, between 5 and 60 ppm, between 5 and 50 ppm, between 5 and 40 ppm, between 5 and 30 ppm, between 5 and 20 ppm, between 5 and 15 ppm, or between 5 and 10 ppm by mass relative to the total mass of said salt (or, respectively, relative to the total mass of composition C);

and preferably a mass content of $Cl^-$ of less than or equal to 50 ppm, preferentially less than or equal to 40 ppm, in particular less than or equal to 30 ppm, especially less than or equal to 25 ppm by mass relative to the total mass of said salt (or, respectively, relative to the total mass of composition C).

According to one embodiment, the LiFSI according to the invention (or composition C according to the invention) is characterized in that the sum of the water content and of the sulfate content is less than or equal to 100 ppm ($[H_2O]+[SO_4^{2-}]\leq 100$ ppm), preferably between 2 and 100 ppm, preferably between 5 and 100 ppm, in particular between 5 and 90 ppm, preferentially between 5 and 90 ppm, for example between 10 and 90 ppm, and advantageously between 10 and 60 ppm.

According to a preferred embodiment, the LiFSI according to the invention (or composition C according to the invention) comprises:

a mass content of water of between 5 and 45 ppm, and in particular between, for example, 8 and 45 ppm, between 9 and 45 ppm, between 10 and 45 ppm, between 11 and 45 ppm, between 12 and 45 ppm, between 13 and 45 ppm, between 14 and 45 ppm, between 15 and 45 ppm, between 16 and 45 ppm, between 17 and 45 ppm, between 18 and 45 ppm, between 19 and 45 ppm, between 20 and 45 ppm, between 21 and 45 ppm, between 22 and 45 ppm, between 23 and 45, between 24 and 45 ppm, between 25 and 45, between 26 and 45 ppm, between 27 and 45 ppm, between 28 and 45 ppm, between 29 and 45 ppm, between 30 and 45 ppm, or between 30 and 40 ppm by mass relative to the total mass of said salt;

a mass content of sulfate ions of less than or equal to 100 ppm, for example between 2 and 100 ppm, between 2 and 90 ppm, between 2 and 80 ppm, between 2 and 70 ppm, between 2 and 60 ppm, between 2 and 50 ppm, between 2 and 40 ppm, between 2 and 30 ppm, between 2 and 20 ppm, between 2 and 15 ppm, between 2 and 10 ppm, between 3 and 90 ppm, between 3 and 80 ppm, between 3 and 70 ppm, between 3 and 60 ppm, between 3 and 50 ppm, between 3 and 40 ppm, between 3 and 30 ppm, between 3 and 20 ppm, between 3 and 15 ppm, between 3 and 10 ppm, between 4 and 100 ppm, between 4 and 90 ppm, between 4 and 80 ppm, between 4 and 70 ppm, between 4 and 60 ppm, between 4 and 50 ppm, between 4 and 40 ppm, between 4 and 30 ppm, between 4 and 20 ppm, between 4 and 15 ppm, between 4 and 10 ppm, between 5 and 100 ppm, between 5 and 90 ppm, between 5 and 80 ppm, between 5 and 70 ppm, between 5 and 60 ppm, between 5 and 50 ppm, between 5 and 40 ppm, between 5 and 30 ppm, between 5 and 20 ppm, between 5 and 15 ppm, or between 5 and 10 ppm by mass relative to the total mass of said salt (or, respectively, relative to the total mass of composition C);

a mass content of $Cl^-$ of less than or equal to 50 ppm;

a mass content of $F^-$ of less than or equal to 200 ppm, preferably less than or equal to 50 ppm;

a mass content of $FSO_3Li$ of less than or equal to 200 ppm;

a mass content of $FSO_2NH_2$ of less than or equal to 200 ppm;

a mass content of $CO_3^{2-}$ of less than or equal to 50 ppm;

a mass content of $ClO_3^-$ of less than or equal to 50 ppm;

a mass content of $ClO_4$ of less than or equal to 50 ppm;

a mass content of $NO_2^-$ of less than or equal to 50 ppm;

a mass content of $NO_3^-$ of less than or equal to 50 ppm;

a mass content of Si of less than or equal to 40 ppm;

a mass content of Mg of less than or equal to 10 ppm;

a mass content of Fe of less than or equal to 10 ppm;

a mass content of Ca of less than or equal to 10 ppm;

a mass content of Pb of less than or equal to 10 ppm;

a mass content of Cu of less than or equal to 10 ppm;

a mass content of Cr of less than or equal to 10 ppm;

a mass content of Ni of less than or equal to 10 ppm;

a mass content of Al of less than or equal to 10 ppm;

a mass content of Zn of less than or equal to 10 ppm; and a mass content of Na of less than or equal to 10 ppm.

According to a preferred embodiment, the LiFSI according to the invention (or composition C according to the invention) comprises:

a mass content of water of between 5 and 45 ppm, and in particular between 10 and 40 ppm by mass relative to the total mass of said salt (or, respectively, relative to the total mass of composition C); and a mass content of water of between 3 and 40 ppm, preferably between 5 and 10 ppm by mass relative to the total mass of said salt (or, respectively, relative to the total mass of composition C).

The present invention also relates to an electrolyte comprising the LiFSI salt according to the invention (or composition C according to the invention), namely comprising:

a mass content of water of between 5 and 45 ppm, preferably between 5 and 40 ppm by mass relative to the total mass of said salt; and a mass content of sulfate ions of less than or equal to 100 ppm, preferably less than or equal to 90 ppm, less than or equal to 80 ppm, less than or equal to 70 ppm, less than or equal to 60 ppm, less than or equal to 50 ppm, less than or equal to 40 ppm, or less than or equal to 30 ppm, less than or equal to 20 ppm, less than or equal to 15 ppm, or less than or equal to 10 ppm by mass relative to the total mass of said salt.

The present invention also relates to the use of the LiFSI salt according to the invention (or of composition C according to the invention) in Li-ion batteries, especially in Li-ion battery electrolytes.

In particular, the LiFSI salt according to the invention (or composition C according to the invention) may be used in Li-ion batteries of mobile devices (for example cellphones, cameras, tablet or laptop computers), or electric vehicles, or for storing renewable energy (such as photovoltaic or wind energy).

The LiFSI salt (or composition C according to the invention) may be used especially in batteries of "pocket" type (also known as "pouch cells").

The LiFSI salt (or composition C according to the invention) may advantageously be used in applications at high or low temperature.

The LiFSI salt according to the invention (or composition C according to the invention) advantageously has at least one of the following advantages:

- reduction of the risks of short-circuiting, of ignition or of explosion of the battery;
- longer service life;
- increase in the number of charging cycles;
- reduction or even elimination of corrosion of the battery constituents, such as the Al collector;
- reduction of the risks of swelling of the battery, especially of flexible batteries of "pocket" type (known as "pouch cells");
- good resistance to high and/or low temperature.

In the context of the invention, the term "between x and y" or "ranging from x to y" means a range in which the limits x and y are included. For example, the temperature "between 30 and 100° C." especially includes the values 30° C. and 100° C.

All the embodiments described above may be combined with each other. In particular, each embodiment of any step of the process of the invention may be combined with another particular embodiment. Similarly, each content of the constituents of the LiFSI salt (or of composition C) may be combined with each other.

The present invention is illustrated by the example which follows, to which it is not, however, limited.

Example 1: Purification and Concentration of an LiFSI Solution

Various impurities present in the lithium bis(fluorosulfonyl)imide salt were analyzed and the results obtained are presented below.

Purification of a Solution of LiFSI in Butyl Acetate

A solution is taken containing 166 g of LiFSI (which may be obtained, for example, according to the process described in WO 2015/158979) in 830 g of butyl acetate. It is concentrated in a rotary evaporator heated to 40° C. under vacuum (pressure<30 mbar). A solution is obtained whose solids content is 37% by mass. Aqueous extraction of the LiFSI contained is performed three times (½ mass of water relative to the mass of the concentrated solution (solids content of 37% by mass), and then ⅓ mass of water relative to the mass of the concentrated solution (solids content of 37% by mass) and then ¼ of mass of water relative to the mass of the concentrated solution (solids content of 37% by mass)). The aqueous phases are pooled (aqueous solution with a solids content of 21%) and concentrated by evaporation under vacuum (P<30 mbar) at 40° C., to give an aqueous solution whose solids content is 35%. The LiFSI recovery yield is 77%. The LiFSI dissolved in water is then re-extracted with four successive extractions in butyl acetate by ¼ of the mass of the aqueous solution. A solution of LiFSI in butyl acetate is obtained (solids content of about 13%). The LiFSI extraction yield is 65%. The solvent-phase extractions are pooled and concentrated first on a rotary evaporator at 40° C. under reduced pressure (P<30 mbar). A solution of LiFSI in butyl acetate with a 43% solids content is obtained.

Concentration of an LiFSI Solution to Obtain Solid LiFSI

The final concentration is performed in an WFSP (wiped-film short-path) evaporation machine at a temperature of 80° C. under a vacuum of 0.5 mbar, for a residence time of about 2 minutes.

The concentrate is taken up in dichloromethane. The LiFSI crystallizes rapidly. 89 g of LiFSI are obtained, which are recovered by filtration and placed under vacuum for at least 24 hours. The analysis is given below.

Sampling for the Quantification of Li, Na and Trace Elements from the List Provided:

The sample of the lithium bis(fluorosulfonyl)imide salt obtained according to the process described above is dissolved in ultra-pure water. Two dilutions were used: 1 g/l for the determination of the Na and the elements Ag, Al, As, Ba, Si, Cd, Co, Cr, Cu, Ni, Pb, Sb, Se, Sn, Sr, Ti and Zn in trace amount, and 0.1 g/l for the analysis of the lithium.

Panoramic Qualitative Analysis:

The ICP-AES (inductively-coupled plasma spectrometry) conditions applied for the "panoramic" semi-quantitative analysis of the elements in trace amount are:

- Output power of the plasma source: 1150 W;
- Flow rate of the nebulization gas: 0.7 L/min;
- Cooling rate=16 L/min;
- Torch height: 12 mm;
- Pump speed: 50 rpm;
- Spectral bandwidth: 7 pm to 200 nm, 3.5 nm per pixel;
- Wavelength range: 167 nm to 847 nm.

The ICP-AES quantification method for measuring Li, Na used five calibration points. The ICP-AES data are obtained on an ICAP 6500 spectrometer (Thermo Electronics).

For the analysis of the elements in trace amount Ag, Al, As, Ba, Si, Cd, Co, Cr, Cu, Ni, Pb, Sb, Se, Sn, Sr, Ti, Zn, the semiquantitative method is based on two calibration points.

For the two methods, sampling is performed by addition of standards to the sample itself so as to minimize the matrix effects.

ICP-AES is preferred to cationic chromatography in aqueous solution for the measurement of the elements Li and Na.

The conditions for analysis of the anions in ion chromatography (IC) are as follows:

- Thermo ICS 5000 DUAL machine;
- AS16-HC column;
- Flow rate 1 ml/min;
- Eluent isocratic KOH at 20 mmol/l;
- Conductimetric detection;
- ASRS 4 mm suppressor with 50 mA of imposed current;
- Injection of 25 μl of LiFSI solutions at 5 g/l and 10 g/l depending on the sensitivity required for the anionic species present;
- Calibration of each anionic species with five synthetic solutions ranging from 0.1 mg/l up to 25 mg/l.

The NMR analysis conditions for the fluorinated species such as $FSO_3Li$ and $FSO_2NH_2$ in $^1H$ and $^{19}F$ NMR are as follows:

Equipment:

The NMR spectra and quantifications were performed on a Brüker AV 400 spectrometer, at t 376.47 MHz for $^{19}F$, on a 5 mm probe of $BBFO^+$ type.

Sampling:

The samples are dissolved in DMSO-d6 (about 30 mg in 0.6 ml). In the case of detection of fluorides or of addition of LiF serving to check the undesirable presence of fluorides, the solvent used is $D_2O$ on account of the insolubility of LiF in DMSO.

Quantification:

The relative quantification in fluorine-19 NMR ($^{19}F$ NMR) is performed by integration of the signals for the fluorinated species, weighted by the number of fluorines contributing to the signal, which is a method well known to those skilled in the art.

The absolute quantification in $^{19}F$ NMR is performed by dosed addition of α□α□α-trifluorotoluene (TFT, Aldrich) to the tube containing the sample, and by integration of the signals for the fluorinated species to be assayed in comparison with that of the $CF_3$ of this internal standard, according to the method that is well known to those skilled in the art. The quantification limit for a species is of the order of a 50th of a ppm.

Water Content:

Performed by Karl Fischer assay on a 684 KF coulometer coupled to an 860 KF Thermoprep (Metrohm equipment).

The solid sample of LiFSI is transferred in a glovebox into a suitable Thermoprep bottle. It is heated at 50° C. for 30 minutes and the gas phase is then introduced into the assay cell of the KF titrimeter.

The results obtained are presented in table 1.

TABLE I

| Species | Amount | Analysis method |
|---|---|---|
| $FSO_2NH_2$ | ND | $^{19}F$ NMR |
| $FSO_3Li$ | ND | $^{19}F$ NMR |
| $H_2O$ | 40 ppm | Karl Fischer |
| $SO_4^{2-}$ | 7 ppm | Cl |
| $Cl^-$ | 22 ppm | Cl |
| F- | ND | NMR |
| $CO_3^{2-}$ | ND | Cl |
| $ClO_3^-$ | ND | Cl |
| $ClO_4^-$ | ND | Cl |
| $NO_2^-$ | ND | Cl |
| $NO_3^-$ | ND | Cl |
| Mg | ND | ICP |
| Si | ND | FX |
| Fe | ND | ICP |
| Ca | ND | ICP |
| Pb | ND | ICP |
| Cu | ND | ICP |
| Cr | ND | ICP |
| Ni | ND | ICP |
| Al | ND | ICP |
| Zn | ND | ICP |
| Na | ND | ICP |

ND: not detected

The process according to the invention advantageously makes it possible to obtain an LiFSI salt with a reduced content of both water and of sulfate ions.

The invention claimed is:

1. A process for drying and purifying a solution of a lithium bis(fluorosulfonyl)imide salt in an organic solvent S1, said process comprising the following steps:

a) addition of deionized water to said solution of the lithium bis(fluorosulfonyl)imide salt in the organic solvent S1 to dissolve and extract the lithium bis (fluorosulfonyl)imide salt, forming an aqueous solution of said salt, wherein the mass of the deionized water is greater than or equal to a third of the mass of said solution of the lithium bis(fluorosulfonyl)imide salt in the organic solvent S1;

a') optional concentration of said aqueous solution of said salt;

b) extraction of the lithium bis(fluorosulfonyl)imide salt from said aqueous solution, with an organic solvent S2, this step being repeated at least once;

c) concentration of said lithium bis(fluorosulfonyl)imide salt by evaporation of said organic solvent S2 and of the water, in a short-path thin-film evaporator, under the following conditions:

temperature of between 30° C. and 95° C.;

pressure between 10-3 mbar abs and 5 mbar abs; and residence time of less than or equal to 15 min;

d) optionally, crystallization of the lithium bis(fluorosulfonyl)imide salt.

2. The process as claimed in claim 1, comprising step a') of concentration of said aqueous solution.

3. The process as claimed in claim 1, in which the organic solvent S2 is chosen from the group consisting of organic carbonates, ethers, esters, and mixtures thereof.

4. The process as claimed in claim 1, in which the organic solvent S1 is chosen from the group consisting of esters, nitriles, ethers, chlorinated solvents and aromatic solvents, and mixtures thereof.

5. The process as claimed in claim 1, in which the organic solvent S2/water mass ratio, during an extraction, ranges from 1/6 to 1/1.

6. The process as claimed in claim 1, in which the concentration step c) is performed at a pressure of between $10^{-2}$ mbar abs and 5 mbar abs.

7. The process as claimed in claim 1, in which step c) is performed at a temperature of between 30° C. and 90° C.

8. The process as claimed in claim 1, in which step c) is performed with a residence time of less than or equal to 5 minutes.

9. The process as claimed in claim 1, in which the organic phase separated from the aqueous solution extracted in step a) is not reintroduced into the subsequent steps b) to d) of the process.

10. The process as claimed in claim 1, in which, during step d), the lithium bis(fluorosulfonyl)imide salt is crystallized under cold conditions at a temperature of less than or equal to 25° C., optionally in an organic solvent S3 chosen from chlorinated solvents, and aromatic solvents, said salt optionally being recovered by filtration.

11. The process as claimed in claim 1, wherein it leads to a lithium bis(fluorosulfonyl)imide salt comprising water in a content of less than or equal to 45 ppm relative to the total mass of said salt.

12. A process for drying and purifying a solution of a lithium bis(fluorosulfonyl)imide salt in an organic solvent S1, said process comprising the following steps:

a) addition of deionized water to said solution of the lithium bis(fluorosulfonyl)imide salt in the organic solvent S1 to dissolve and extract the lithium bis (fluorosulfonyl)imide salt, forming an aqueous solution of said salt;

a') concentration of said aqueous solution of said salt;

b) extraction of the lithium bis(fluorosulfonyl)imide salt from said aqueous solution with an organic solvent S2, forming an organic solution, this step being repeated at least once;

c') concentration of the organic solution to obtain a concentrated organic solution with a mass content of the lithium bis(fluorosulfonyl)imide salt of between 20% and 60%;

c) concentration of said concentrated organic solution by evaporation of said organic solvent S2 and of the water, in a short-path thin-film evaporator, under the following conditions:

temperature of between 30° C. and 95° C.;

pressure between $10^{-3}$ mbar abs and 5 mbar abs; and residence time of less than or equal to 15 min;

d) optionally, crystallization of the lithium bis(fluorosulfonyl)imide salt.

13. The process as claimed in claim 12, in which the concentration step c') is performed in a rotary evaporator.

14. The process as claimed in claim 12, in which the concentration step c') is performed at a temperature of between 25° C. and 60° C.

15. The process as claimed in claim 12, in which the concentration step c') is performed at a pressure below 50 mbar abs.

* * * * *